United States Patent
Harris et al.

(10) Patent No.: US 9,440,607 B1
(45) Date of Patent: Sep. 13, 2016

(54) ENERGY DIVERTING BUMPER STRUCTURES FOR BUMPERS AND METHODS OF CONNECTING ENERGY DIVERTING BUMPER STRUCTURES

(71) Applicant: Toyota Motor Engineering & Manufacturing North America, Inc., Erlanger, KY (US)

(72) Inventors: Ryan Craig Harris, Saline, MI (US); Edgardo Reyes-Crespo, Ypsilanti, MI (US); Scott L. Frederick, Brighton, MI (US); Palani Palaniappan, Ann Arbor, MI (US); Avinash S. Phadatare, Canton, MI (US); Kristin Zwirlein, Ypsilanti, MI (US); Sanjeev Gupta, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/709,788

(22) Filed: May 12, 2015

(51) Int. Cl.
*B60R 19/44* (2006.01)
*B60R 19/16* (2006.01)
*B60R 19/02* (2006.01)

(52) U.S. Cl.
CPC ............. *B60R 19/44* (2013.01); *B60R 19/023* (2013.01); *B60R 19/16* (2013.01)

(58) Field of Classification Search
CPC ..... B60R 19/02; B60R 19/023; B60R 19/16; B60R 19/44; B62D 21/15; B62D 21/152
USPC ............... 293/142, 144, 149, 150, 151, 155; 296/187.03, 187.09, 187.1
See application file for complete search history.

(56) References Cited

U.S. PATENT DOCUMENTS

| | | | |
|---|---|---|---|
| 6,846,026 B2 | 1/2005 | Detwiler et al. | |
| 6,886,873 B2 | 5/2005 | Weykamp et al. | |
| 8,052,184 B2 | 11/2011 | Braunbeck et al. | |
| 9,248,795 B1 * | 2/2016 | Schnabelrauch | ....... B60R 19/44 |

FOREIGN PATENT DOCUMENTS

| KR | 20100104457 | 9/2010 |
|---|---|---|
| WO | 2014088117 | 6/2014 |

* cited by examiner

*Primary Examiner* — Jason S Daniels
(74) *Attorney, Agent, or Firm* — Dinsmore & Shohl LLP

(57) ABSTRACT

A bumper includes a bumper reinforcement beam and a reinforcement bracket positioned on a front side of the bumper reinforcement beam at an outboard end of the bumper reinforcement beam. An energy diverting bumper structure is positioned on a front side of the reinforcement bracket. The energy diverting bumper structure is connected directly to the reinforcement bracket and is connected indirectly to the bumper reinforcement beam through the reinforcement bracket.

18 Claims, 9 Drawing Sheets

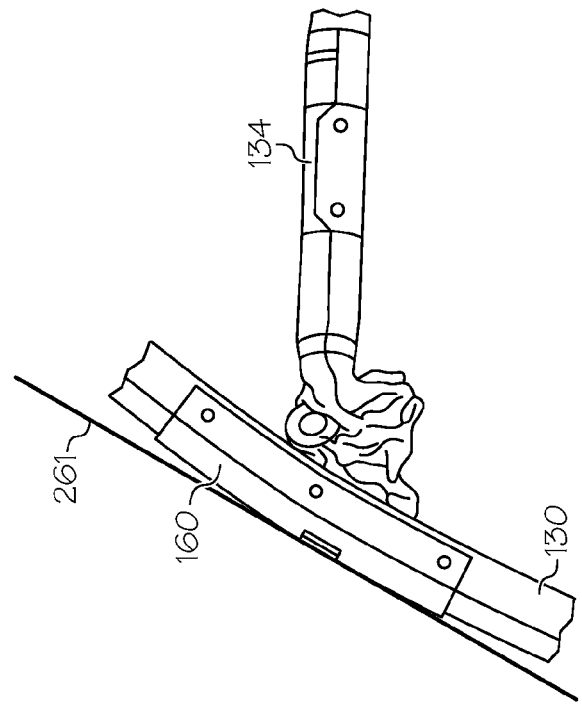
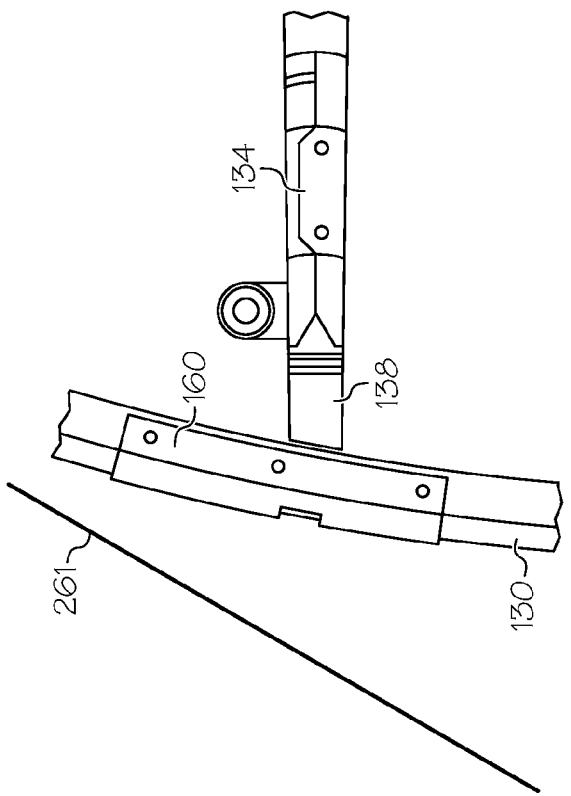

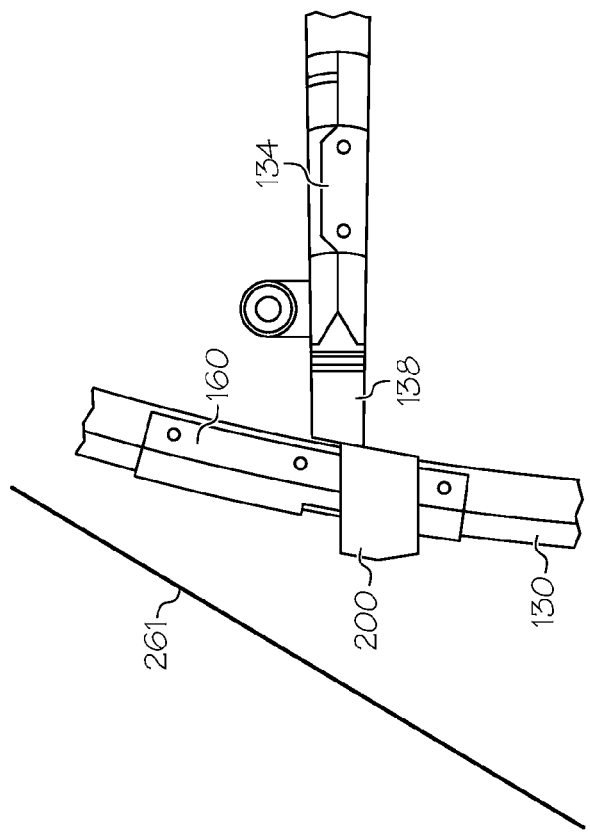
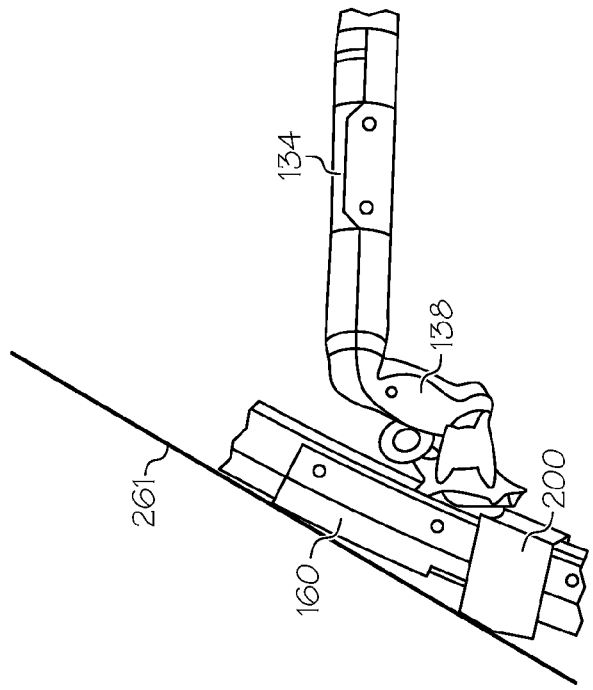
FIG. 9A
FIG. 9B ously designed to deform and/or move in order to alter a load path through the bumper. By directing loads through the energy diverting bumper structure to the reinforcement bracket, the energy diverting bumper structure can be relatively light weight compared to other designs, which may provide weight savings and improved fuel efficiency.

ENERGY DIVERTING BUMPER STRUCTURES FOR BUMPERS AND METHODS OF CONNECTING ENERGY DIVERTING BUMPER STRUCTURES

TECHNICAL FIELD

The present specification generally relates to bumpers and vehicles that include bumpers, and more specifically, bumpers that include energy diverting bumper structures.

BACKGROUND

Vehicles may be equipped with bumper systems and impact protection structures that elastically and plastically deform to absorb energy in the event of an impact. A number of standards and tests currently exist. For example, the National Highway Traffic Safety Administration has a legislative mandate under Title 49 of the United States Code, Chapter 301, Motor Vehicle Safety, to issue Federal Motor Vehicle Safety Standards (FMVSS) and Regulations to which manufacturers of motor vehicle and equipment items must conform and certify compliance. Another test, the small overlap test, such as conducted by Insurance Institute for Highway Safety (IIHS), replicates what happens when the front corner impacts an object.

While current countermeasures are being used to satisfy a variety of tests and standards, one countermeasure used to satisfy a particular test may affect the vehicle's performance in a different test area, for example, by redirecting a load path during a particular impact test. Accordingly, a need exists for energy diverting structures that can alter or redirect load paths in order to satisfy over a number of different standards.

SUMMARY

In one embodiment, a bumper includes a bumper reinforcement beam and a reinforcement bracket positioned on a front side of the bumper reinforcement beam at an outboard end of the bumper reinforcement beam. An energy diverting bumper structure is positioned on a front side of the reinforcement bracket. The energy diverting bumper structure is connected directly to the reinforcement bracket and is connected indirectly to the bumper reinforcement beam through the reinforcement bracket.

In another embodiment, a vehicle includes a side support that extends in a vehicle longitudinal direction. A bumper reinforcement beam is coupled to the side support, wherein the bumper reinforcement beam extends in a vehicle lateral direction that is transverse to the vehicle longitudinal direction, and wherein the bumper reinforcement beam comprises a front side that is oriented to face forward in the vehicle longitudinal direction. A reinforcement bracket is positioned on a front side of the bumper beam assembly at an outboard end of the bumper reinforcement beam. An energy diverting bumper structure is positioned on a front side of the reinforcement bracket. The energy diverting bumper structure is connected directly to the reinforcement bracket and is connected indirectly to the bumper reinforcement beam through the reinforcement bracket.

In another embodiment, a method of assembling a bumper of a vehicle is provided. The method includes providing a bumper reinforcement beam that is configured to connect to a side support and that extends in a vehicle longitudinal direction. A bumper reinforcement subassembly is connected to a front side of the bumper reinforcement beam. The bumper reinforcement subassembly includes a reinforcement bracket and an energy diverting bumper structure positioned on a front side of the reinforcement bracket. The energy diverting bumper structure is connected directly to the reinforcement bracket and is connected indirectly to the bumper reinforcement beam through the reinforcement bracket.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 7A-9B illustrate operation of the energy diverting bumper structure of FIG. 2.

DETAILED DESCRIPTION

Vehicles according to the present specification include a bumper beam assembly that includes a bumper reinforcement beam, where the bumper reinforcement beam extends in a vehicle lateral direction, and a front side of the bumper reinforcement beam is oriented to face forward in a vehicle longitudinal direction. A reinforcement bracket is coupled to the front side of the bumper reinforcement beam. The reinforcement bracket includes an inboard edge, an outboard edge, and a central portion that extends between the inboard edge and the outboard edge of the reinforcement bracket in the vehicle lateral direction. The reinforcement bracket is shaped and arranged to change a load path when contacted by a 30 degree rigid barrier in accordance with Federal Motor Vehicle Safety Standards (FMVSS) 208, incorporated herein by reference, from a baseline load path provided by the bumper reinforcement beam alone without the reinforcement bracket to an inboard load path. An energy diverting bumper structure is connected to a front side of the central portion of the reinforcement bracket. As will be described below, the energy diverting bumper structure may be preassembled with the reinforcement bracket before connecting the subassembly to the bumper reinforcement beam. The energy diverting bumper structure is shaped and arranged to change the inboard load path closer to the baseline load path when contacted by a 30 degree rigid barrier in accordance with FMVSS 208.

Figure 1:
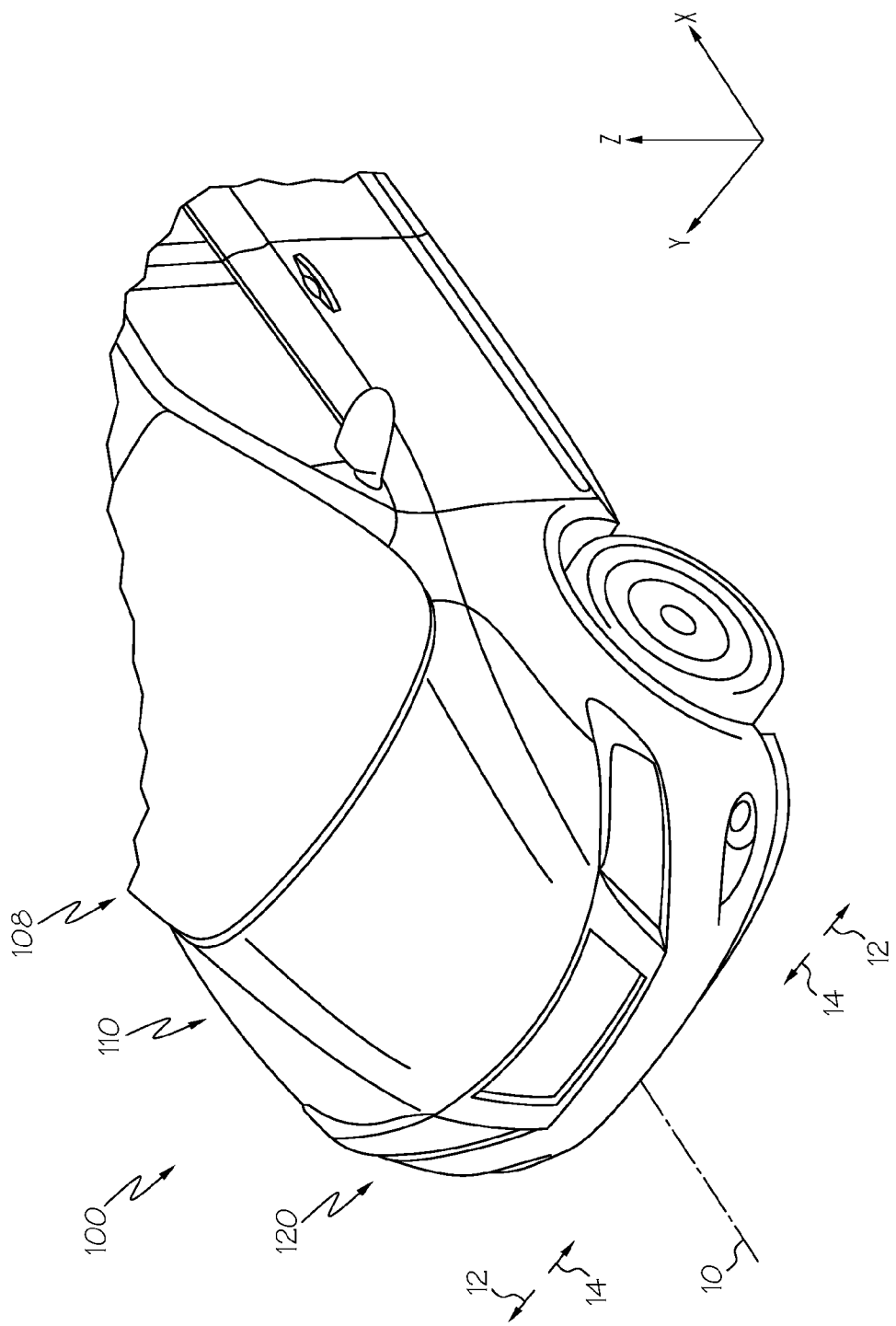
FIG. 1 schematically depicts a perspective view of a vehicle according to one or more embodiments shown or described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard" and "outboard" are used to describe the relative positioning of various components of the vehicle. Referring to FIG. 1, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology depicted in FIG. 1 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring initially to FIG. 1, a vehicle 100 is depicted. The vehicle 100 includes a unibody 110 onto which a vehicle drivetrain is coupled. The vehicle 100 also includes a cabin 108 that is integral with the unibody 110. The cabin 108 generally defines a passenger cabin of the vehicle 100. The vehicle 100 includes a bumper 120 that is positioned at the front of the vehicle 100.

Figure 2:
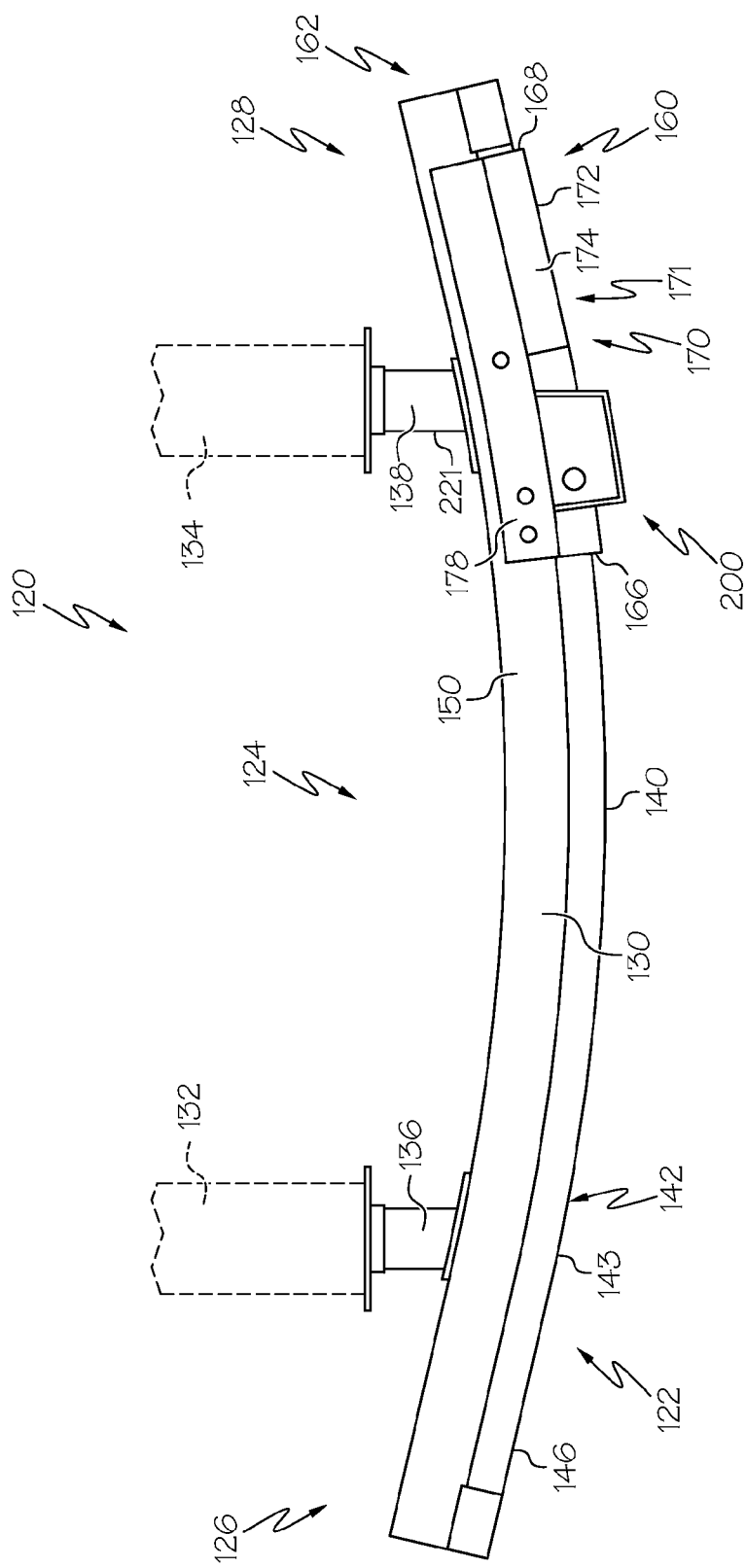
FIG. 2 depicts a top view of a bumper beam assembly including an energy diverting bumper structure according to one or more embodiments shown or described herein.
Figure 3:
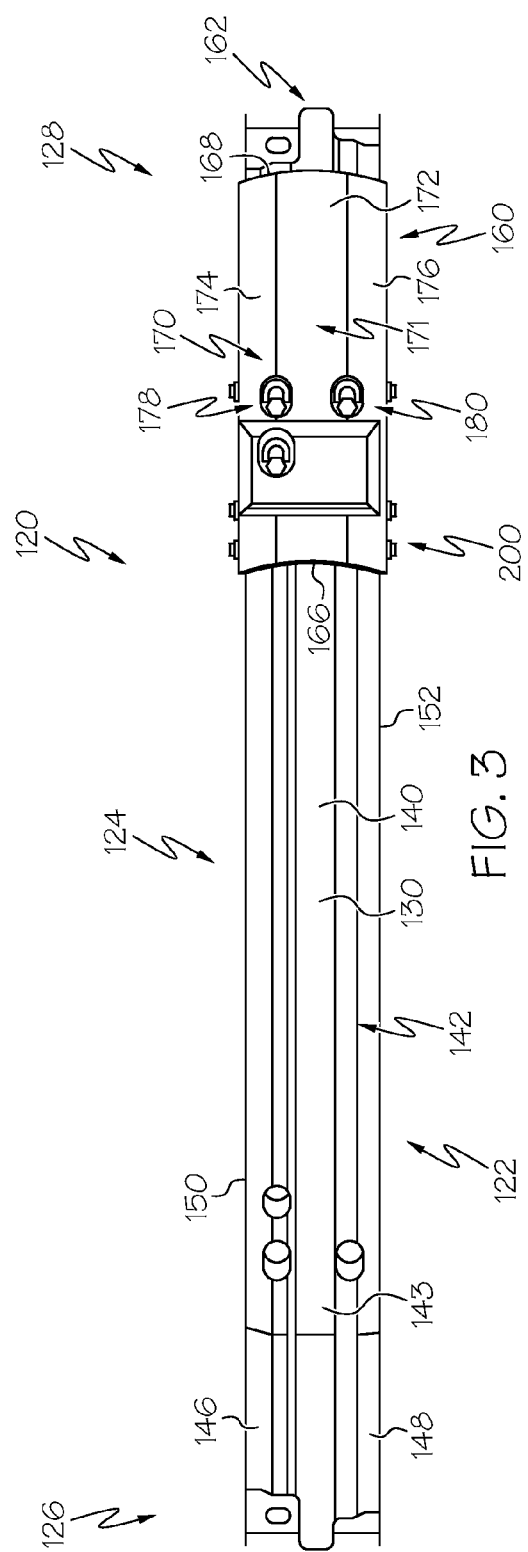
FIG. 3 depicts a front view of the bumper beam assembly of FIG. 2 according to one or more embodiments shown or described herein.

Referring to FIGS. 2 and 3, the bumper 120 is depicted. The bumper 120 includes a bumper beam assembly 122, which may include a bumper reinforcement beam 130 having a bumper central portion 124 and bumper extension portions 126 and 128 that extend in the vehicle lateral directions from the central portion 124 beyond front side members 132 and 134. Crush boxes 136 and 138 may be provided between the front side members 132 and 134 and the bumper reinforcement beam 130.

The bumper reinforcement beam 130 and the bumper extension portions 126 and 128 extend in the vehicle lateral direction. The bumper reinforcement beam 130 may have a generally curved shape, as depicted in FIG. 2. More specifically, an inboard position 140 on a front side 142 of the bumper reinforcement beam 130 may be positioned forward of an outboard position 143 on the front side 142 of the bumper reinforcement beam 130 in the vehicle longitudinal direction, thereby giving the bumper reinforcement beam 130 a generally curved shape. In other embodiments, the bumper reinforcement beam 130 may have a generally straight shape extending in the vehicle lateral direction. The bumper reinforcement beam 130 may alternatively have any suitable shape that extends in the vehicle lateral direction.

The bumper extension portions 126 and 128 are positioned at outboard ends of the bumper reinforcement beam 130. The bumper extension portions 126 and 128 may refer to the portions of the bumper reinforcement beam outboard of the front side members 132 and 134. The bumper extension portions 126 and 128 may be formed as separate members that are coupled to the bumper central portion 124 to form the bumper reinforcement beam 130. Alternatively, the bumper extension portions 126 and 128 may be integrally formed with the bumper central portion 124 to form the bumper reinforcement beam 130. In embodiments where the bumper extension portions 126 and 128 are coupled to the bumper central portion 124, the bumper extension portions 126 and 128 may be coupled to the bumper central portion 124 through a variety of joining techniques, including, but not limited to, a welded attachment, a brazed attachment, mechanical fasteners, and/or structural adhesives.

Figure 4:
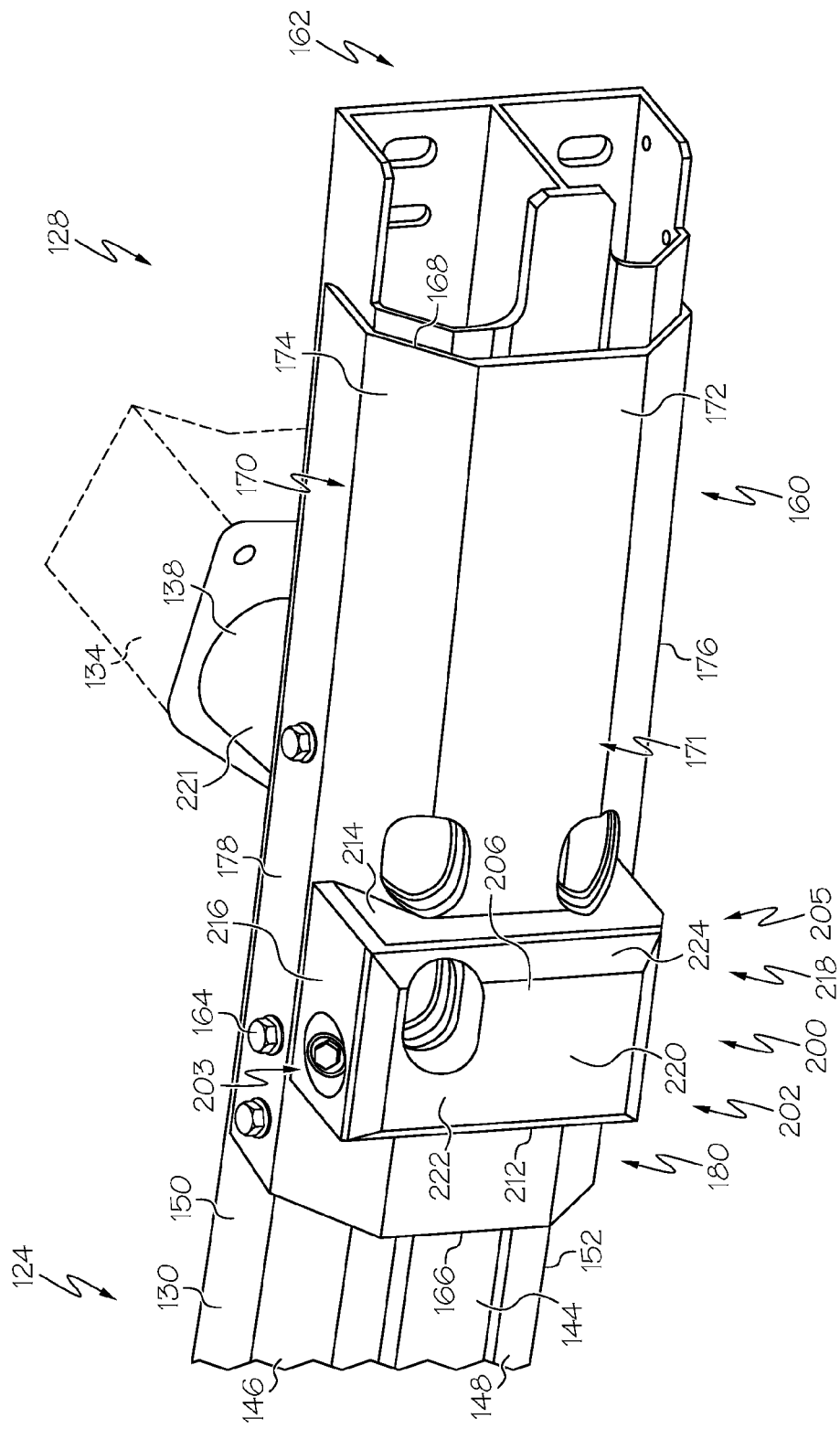
FIG. 4 depicts a perspective view of the bumper beam assembly of FIG. 2 according to one or more embodiments shown or described herein.

Referring also to FIG. 4, the bumper reinforcement beam 130 including the bumper extension portions 126 and 128 include the front side 142 that is oriented to face forward in the vehicle longitudinal direction. The front side 142 of the bumper reinforcement beam 130 may have a generally front facing surface 144 that extends in the vehicle lateral direction. In the illustrated embodiment, the front side 142 of the bumper beam assembly 122 may include the front facing surface 144 and upper and lower surfaces 146 and 148 that extend in both vehicle vertical and longitudinal directions, rearwardly from the front facing surface 144 defining a somewhat C-shaped section of the bumper reinforcement beam 130. The front side 142 of the bumper reinforcement beam 130 may alternatively include any suitably shaped surface. The bumper reinforcement beam 130 further includes a top side 150 and a bottom side 152 that is positioned opposite the top side 150. The top side 150 and the bottom side 152 of the bumper reinforcement beam 130 may be oriented transverse to the front facing surface 144, extending rearwardly from the upper surface 146 and lower surface 148, respectively.

A reinforcement bracket 160 is coupled to the bumper reinforcement beam 130 at an outboard end 162 of the bumper reinforcement beam 130. While only one reinforcement bracket is illustrated for clarity, another reinforcement bracket may be provided at an opposite outboard end of the bumper reinforcement beam 130 in the same or similar manner as that described herein. The reinforcement bracket 160 may be formed from a variety of materials including, for example and without limitation, metals, composites, and the like, and may be formed by any suitable method or combination of methods such as stamping, forging, machining, and the like. The reinforcement bracket 160 is coupled about the front side 142 of the bumper reinforcement beam 130 at fastening locations 164 extending along the top and bottom sides 150 and 152 of the bumper reinforcement beam 130. In the depicted embodiment, the reinforcement bracket 160 is coupled over the bumper extension portion 128 and central portion 124 of the bumper reinforcement beam 130 such that the reinforcement bracket 160 spans between the central portion 124 and the bumper extension portion 128 and extends across the front side member 134.

The reinforcement bracket 160 includes an inboard edge 166 at the bumper central portion 124 and an outboard edge 168 at the bumper extension portion 128 that is positioned outboard from the inboard edge 166 in the vehicle lateral direction. The inboard edge 166 and the outboard edge 168 of the reinforcement bracket 160 may be coupled directly to the front side 142 of the bumper reinforcement beam 130.

The reinforcement bracket 160 includes a central portion 170 that is positioned between the inboard edge 166 and the outboard edge 168 in the vehicle lateral direction.

The central portion 170 may have a contour that nests around the bumper reinforcement beam 130 and extends between the top side 150 and the bottom side 152 of the bumper reinforcement beam 130 in the vehicle vertical direction. The central portion 170 may generally have a front side 171 including a front facing surface 172 that extends in the vehicle lateral direction. The central portion 170 may further include upper and lower surfaces 174 and 176 that extend in both vehicle vertical and longitudinal directions, rearwardly from the front facing surface 172 defining a somewhat C-shaped section of the reinforcement bracket 160.

In the illustrated embodiment, top and bottom sides 178 and 180 of the central portion 170 extend across the top side 150 and the bottom side 152, respectively, of the bumper reinforcement beam 130 in the vehicle longitudinal direction, such that the reinforcement bracket 160 forms a sleeve over the bumper reinforcement beam 130. The central portion 170 may be coupled to the top side 150 and/or the bottom side 152 of the bumper reinforcement beam 130 at the fastening locations 164.

An energy diverting bumper structure 200 is coupled to the bumper reinforcement beam 130. While only one energy diverting bumper structure is illustrated for clarity, another energy diverting bumper structure may be provided at an opposite outboard end of the bumper reinforcement beam 130 in the same or similar manner as that described herein. The energy diverting bumper structure 200 may be formed from a variety of materials including, for example and without limitation, metals, composites, and the like, and may be formed by any suitable method or combination of methods such as molding, stamping, forging, machining, and the like. One suitable material is aluminum. In some embodiments, the energy diverting bumper structure 200 is connected to the bumper reinforcement beam 130 between the inboard edge 166 and the outboard edge 168 of the reinforcement bracket 160. Referring to FIG. 4, the energy diverting bumper structure 200 generally includes an energy diverting portion 202, upper connecting portion 203 and lower connecting portion 205. The energy diverting portion 202 may be located nearer to the inboard edge 166 of the reinforcement bracket 160 than the outboard edge 168 in the vehicle lateral direction. The energy diverting portion 202 is positioned forward of the reinforcement bracket 160 in the vehicle longitudinal direction, which will allow the energy diverting portion 202 to influence a load path during an impact, as will be described in greater detail below.

The energy diverting portion 202 includes a support body 206 that, in the illustrated embodiment, is a solid, monolithic metal support body 206. As used herein, the term "monolithic" refers to a one-piece structure. The solid metal support body 206 can provide suitable compressive stress resistance during an impact. The support body 206 includes an inboard side wall 212, an outboard side wall 214, a top side wall 216 and a bottom side wall 218. Extending between the walls 212, 214, 216 and 218 is a front impact surface 220. As can be seen, the outboard side wall 214 of the support body 206 may be located outboard of an inboard edge 221 of the crush box 138 (FIG. 2). In other embodiments, the outboard side wall 214 of the support body 206 may be located inboard of the inboard edge 221 of the crush box 138. The front impact surface 220 may have a first portion 222 defining a first plane and a second portion 224 defining a second plane that intersects the first plane, thereby providing the second portion 224 with an angled orientation relative to the first portion 222 of the front impact surface 220 that angles rearwardly toward the outboard side wall 214 of the support body 206.

Figure 5:
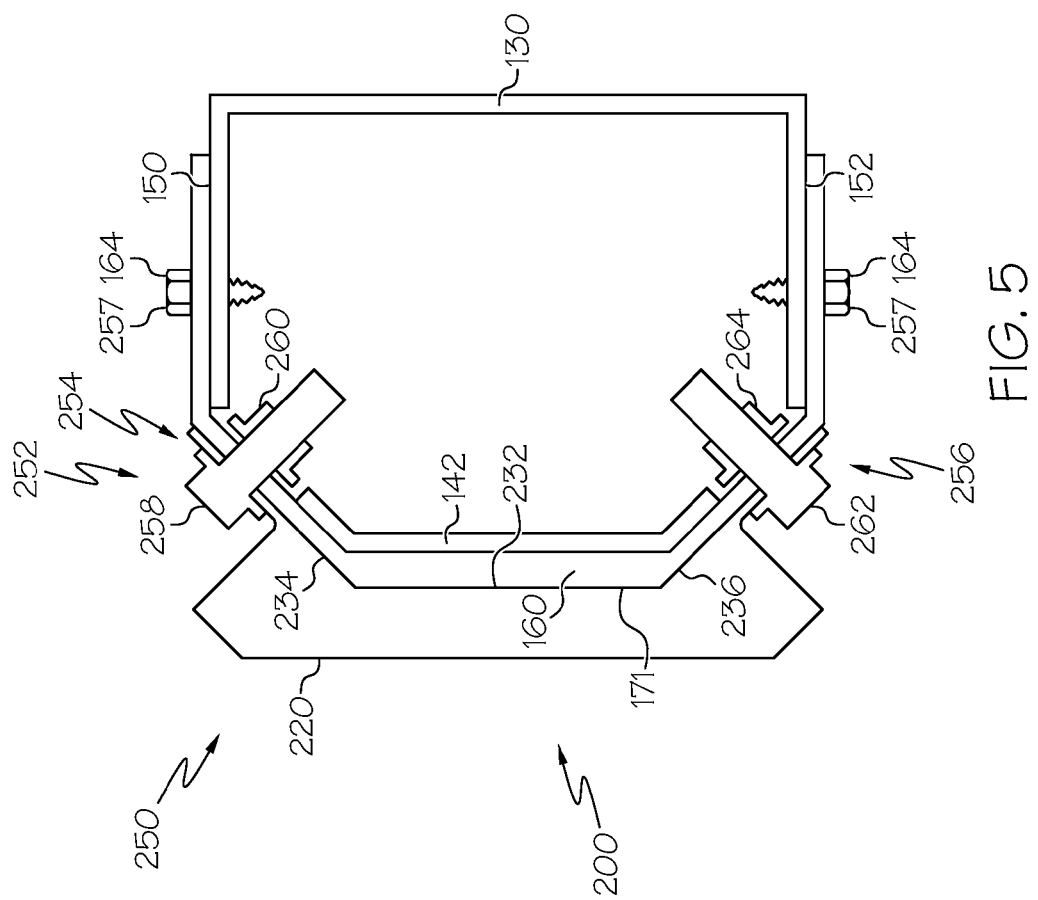
FIG. 5 depicts a section view of the bumper beam assembly and energy diverting bumper structure of FIG. 4 according to one or more embodiments shown or described herein.

Referring to FIG. 5, the energy diverting bumper structure 200 is shaped to nest upon the front sides 171 and 142 of the reinforcement bracket 160 and the bumper reinforcement beam 130. The energy diverting bumper structure 200 includes a rear side 230 having a geometry that is different from the front impact surface 220 including a rear facing surface 232 that extends in the vehicle lateral direction and upper and lower surfaces 234 and 236 that extend in both vehicle vertical and longitudinal directions, rearwardly from the rear facing surface 232 defining a somewhat C-shaped rear side 230 of the energy diverting bumper structure 200 that corresponds to the C-shaped section geometries of the bumper reinforcement beam 130 and the reinforcement bracket 160.

As shown in FIG. 5, the energy diverting bumper structure 200 is connected directly to the reinforcement bracket 160 and is connected indirectly to the bumper reinforcement beam 130 through the reinforcement bracket 160. In the illustrated embodiment, the energy diverting bumper structure 200 and reinforcement bracket 160 form a bumper reinforcement subassembly 250. The energy diverting bumper structure 200 is connected directly to the reinforcement bracket 160 using a first fastening assembly 252. The first fastening assembly 252 includes a first interlocking fastener connection 254 and a second interlocking fastener connection 256. The first interlocking fastener connection 254 includes a fastener member 258 (e.g., a bolt, screw, etc.) and an interlocking member 260 (e.g., a nut) that interlocks with the fastener member 258 (e.g., using a threaded, snap, friction connection). The second interlocking fastener connection 256 includes a fastener member 262 (e.g., a bolt, screw, etc.) and an interlocking member 264 (e.g., a nut) that interlocks with the fastener member 262 (e.g., using a threaded, snap, friction connection). The reinforcement bracket is connected directly to the bumper reinforcement beam 130 using a second fastening assembly 255. The second fastening assembly 255 includes fasteners 257 at fastening locations 164 at the top and bottom sides 150 and 152 of the bumper reinforcement beam 130.

Figure 6:
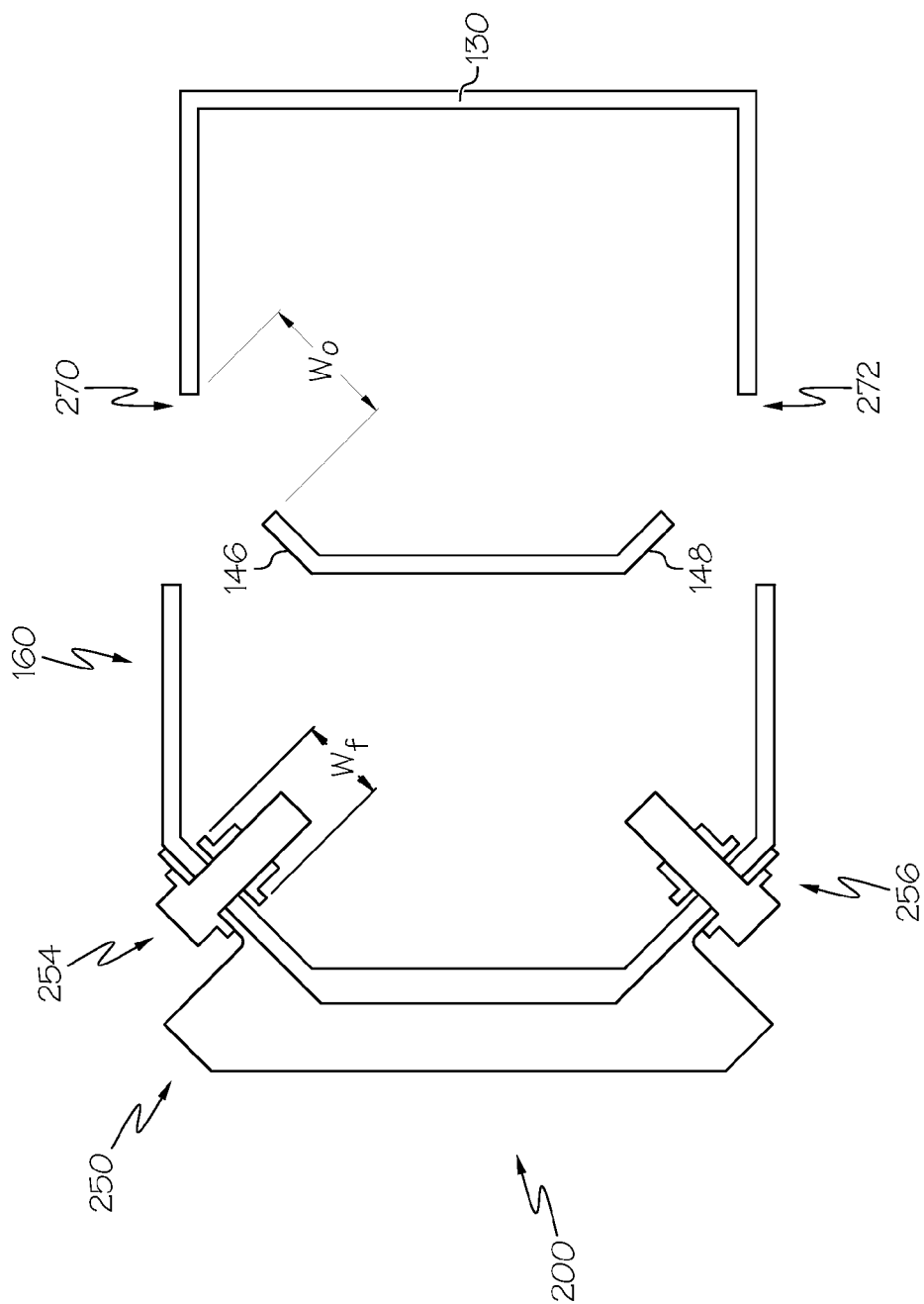
FIG. 6 depicts an exploded view of a bumper reinforcement subassembly including the energy diverting bumper structure of FIG. 5 and a reinforcement bracket according to one or more of the embodiments shown or described herein.

Referring briefly to FIG. 6, the first interlocking fastener connection 254 and the second interlocking fastener connection 256 directly connect the energy diverting bumper structure 200 to the reinforcement bracket 160 to provide the bumper reinforcement subassembly 250. As can be seen, the energy diverting bumper structure 200 may be connected directly to the reinforcement bracket 160 prior to connecting the bumper reinforcement subassembly 250 to the bumper reinforcement beam 130. Further, the bumper reinforcement subassembly 250 may be removed from the bumper reinforcement beam 130 without disconnecting the energy diverting bumper structure 200 from the reinforcement bracket 160. The bumper reinforcement beam 130 includes fastener receiving openings 270 and 272 that are sized to receive the first interlocking fastener connection 254 and the second interlocking fastener connection 256. In some embodiments, fastener receiving opening 270 extends through the bumper reinforcement beam 130 at the upper surface 146 of the bumper reinforcement beam 130 and the fastener receiving opening 272 extends through the bumper reinforcement beam 130 at the lower surface 148 of the bumper reinforcement beam 130. As can be seen by FIGS. 5 and 6, the fastener receiving openings 270 and 272 have a width $W_o$ that is greater than a width $W_f$ of the associated first and second interlocking fastener connection 254 and 256 such that the first and second interlocking fastener connections 254 and 256 can be freely received within (and freely removed from) the respective fastener receiving opening 270, 272. As used herein, "freely received and freely removed" means capable of being received or removed without interlocking or friction interference.

Figure 7A:
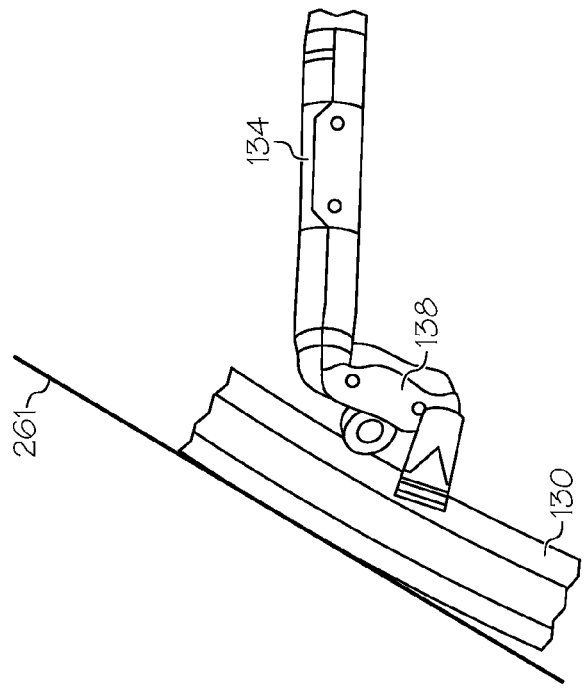

FIGS. 7A-9B illustrate operation of the energy diverting bumper structure 200 in changing a load path provided by the reinforcement bracket 160 closer to a baseline load path provided by the bumper reinforcement beam 130 alone. As used herein, the term "load path" refers to the direction in which a load will pass through connected members. In FIGS. 7-9, the load path is from an impact structure, particularly a 30 degree rigid barrier in accordance with FMVSS 208, and through the bumper beam assembly to the front side member.

Figure 7B:
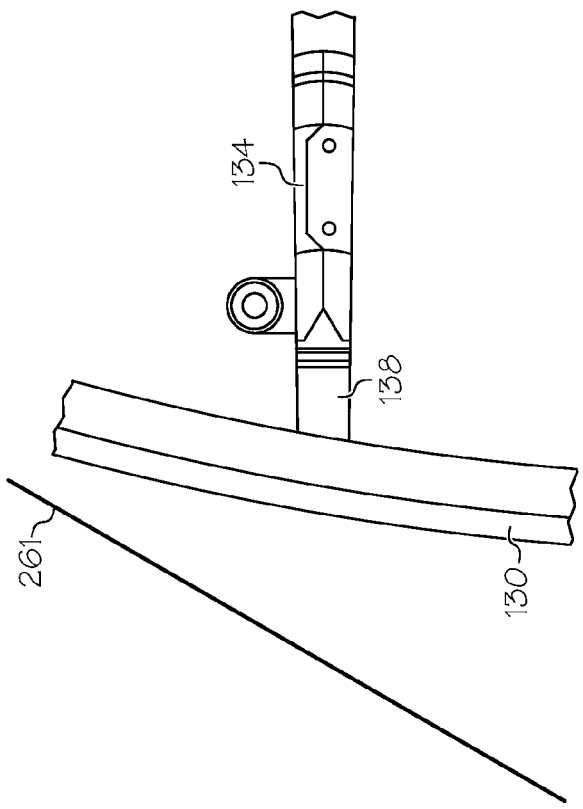

Referring first to FIGS. 7A and 7B, the bumper reinforcement beam 130 provides a baseline load path when contacted by a 30 degree rigid barrier 261 in accordance with FMVSS 208 that is offset inboard of the side member 134. Such an offset arrangement inboard of the side member 134 can provide the illustrated S-shaped deformation mode for the side member 134 and crush box 138. Referring to FIGS. 8A and 8B, the reinforcement bracket 160 is added to meet a small overlap impact test. A vehicle involved in a small front bumper overlap impact test may have only a portion of the front bumper reinforcement beam contact a barrier, for example less than about 25% of the width of the front bumper reinforcement beam. In such small front bumper overlap collisions, some of the energy dissipation elements of the vehicle may not be initiated or may be partially initiated. For example, energy dissipation elements that are positioned along the opposite side of the vehicle from the location of the barrier impact may not be initiated or may be partially initiated. Instead, in small front bumper overlap impact tests, the energy that is introduced to the vehicle structures may be non-symmetrical across the vehicle width. Accordingly, the response of the vehicle structures to the energy introduced by the small overlap impacts may introduce a non-symmetrical response to the vehicle structures. Referring to embodiments disclosed herein that are incorporated into vehicles that have a unibody construction, the structural members of the unibody, for example, may be non-symmetrically loaded when the vehicle is involved in a small front bumper overlap impact test.

While the reinforcement bracket 160 may be effective in a small front bumper overlap impact test, the reinforcement bracket 160 moves the load path from the baseline load path offset inboard of the side member 134 further outboard and more in alignment with the side member 134. Such an arrangement aligned with the side member 134 changes the deformation mode to more of a linear deformation of the side member 134 and crush box 138, which can increase deceleration of the vehicle during an impact. Referring now to FIGS. 9A and 9B, addition of the energy diverting bumper structure 200 moves the load path inboard of the side member 134, closer to the baseline load path. This is due at least in part to the shape of the second portion 224 of the front impact surface 220 and the location of the support body 206 inboard of a longitudinal axis of the side member 134.

It should now be understood that bumpers according to the present disclosure may include a bumper beam assembly including a reinforcement bracket coupled to a front side of the bumper beam assembly. Because the reinforcement bracket changes the load path from a baseline load path inboard of the side member, an energy diverting bumper structure is provided that is connected to the reinforcement bracket and the bumper reinforcement beam. The energy diverting bumper structure is shaped and located to change the load path closer to the baseline load path to a location inboard of the side member to provide a preferred deformation mode for the side member.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bumper comprising:
   a bumper reinforcement beam;
   a reinforcement bracket positioned on a front side of the bumper reinforcement beam at an outboard end of the bumper reinforcement beam; and
   an energy diverting bumper structure positioned on a front side of the reinforcement bracket;
   wherein the energy diverting bumper structure is connected directly to the reinforcement bracket and is connected indirectly to the bumper reinforcement beam through the reinforcement bracket;
   wherein the energy diverting bumper structure is connected directly to the reinforcement bracket using a first fastening assembly, the bumper reinforcement beam includes a fastener receiving opening sized to freely receive the first fastening assembly.

2. The bumper of claim 1, wherein the first fastening assembly comprises a first interlocking fastener connection and a second interlocking fastener connection, where a front impact surface of the energy diverting bumper structure is located between the first interlocking fastener connection and the second interlocking fastener connection.

3. The bumper of claim 1, wherein the first fastening assembly includes a first interlocking fastener connection comprising a fastener member and an interlocking member interlocked with the fastener member.

4. The bumper of claim 3, wherein the bumper reinforcement beam includes the fastener receiving opening sized to freely receive the first interlocking fastener connection.

5. The bumper of claim 4, wherein the first fastening assembly includes a second interlocking fastener connection comprising a fastener member and an interlocking member interlocked with the fastener member of the second interlocking fastener connection.

6. The bumper of claim 5, wherein the fastener receiving opening is a first fastener receiving opening, the bumper reinforcement beam including a second fastener receiving opening sized to freely receive the second interlocking fastener connection.

7. The bumper of claim 1, wherein the energy diverting bumper structure includes an energy diverting portion that extends outwardly from the reinforcement bracket to a front impact surface that is arranged and configured to influence a load path during a 30 degree rigid barrier test in accordance with Federal Motor Vehicle Safety Standards (FMVSS) 208.

8. The bumper of claim 1, wherein the energy diverting bumper structure includes a monolithic metal support body.

9. A vehicle comprising:
a side support that extends in a vehicle longitudinal direction;
a bumper reinforcement beam coupled to the side support, wherein the bumper reinforcement beam extends in a vehicle lateral direction that is transverse to the vehicle longitudinal direction, and wherein the bumper reinforcement beam comprises a front side that is oriented to face forward in the vehicle longitudinal direction;
a reinforcement bracket positioned on a front side of the bumper beam assembly at an outboard end of the bumper reinforcement beam; and
an energy diverting bumper structure positioned on a front side of the reinforcement bracket;
wherein the energy diverting bumper structure is connected directly to the reinforcement bracket and is connected indirectly to the bumper reinforcement beam through the reinforcement bracket;
wherein the energy diverting bumper structure is connected directly to the reinforcement bracket using a first fastening assembly, the bumper reinforcement beam includes a fastener receiving opening sized to freely receive the first fastening assembly.

10. The vehicle of claim 9, wherein the first fastening assembly comprises a first interlocking fastener connection and a second interlocking fastener connection, where a front impact surface of the energy diverting bumper structure is located between the first interlocking fastener connection and the second interlocking fastener connection.

11. The vehicle of claim 9, wherein the first fastening assembly includes a first interlocking fastener connection comprising a fastener member and an interlocking member interlocked with the fastener member.

12. The vehicle of claim 11, wherein the bumper reinforcement beam includes the fastener receiving opening sized to freely receive the first interlocking fastener connection.

13. The vehicle of claim 12, wherein the first fastening assembly includes a second interlocking fastener connection comprising a fastener member and an interlocking member interlocked with the fastener member of the second interlocking fastener connection.

14. The vehicle of claim 13, wherein the fastener receiving opening is a first fastener receiving opening, the bumper reinforcement beam including a second fastener receiving opening sized to freely receive the second interlocking fastener connection.

15. The vehicle of claim 9, wherein the energy diverting bumper structure includes a monolithic metal support body.

16. A method of assembling a bumper of a vehicle, the method comprising:
providing a bumper reinforcement beam configured to connect to a side support and that extends in a vehicle longitudinal direction; and
connecting a bumper reinforcement subassembly to a front side of the bumper reinforcement beam, the bumper reinforcement subassembly comprising:
a reinforcement bracket; and
an energy diverting bumper structure positioned on a front side of the reinforcement bracket;
wherein the energy diverting bumper structure is connected directly to the reinforcement bracket and is connected indirectly to the bumper reinforcement beam through the reinforcement bracket;
wherein the energy diverting bumper structure is connected directly to the reinforcement bracket using a first fastening assembly, the bumper reinforcement beam includes a fastener receiving opening sized to freely receive the first fastening assembly.

17. The method of claim 16, wherein the first fastening assembly includes a first interlocking fastener connection comprising a fastener member and an interlocking member interlocked with the fastener member.

18. The method of claim 17 comprising inserting the first interlocking fastener connection into the fastener receiving opening of the bumper reinforcement beam sized to freely receive the first interlocking fastener connection.

* * * * *